Jan. 10, 1967 G. D. HARNEY ETAL 3,297,981

METHOD AND APPARATUS FOR CORRELATING AND NORMALIZING SIGNALS

Filed Nov. 20, 1963 3 Sheets-Sheet 1

INVENTORS
GEORGE D. HARNEY,
DOUGLAS S. SULLIVAN,
BY MILFORD R. LEE &
JIMMY R. COLE

William J. Miller
ATTORNEY

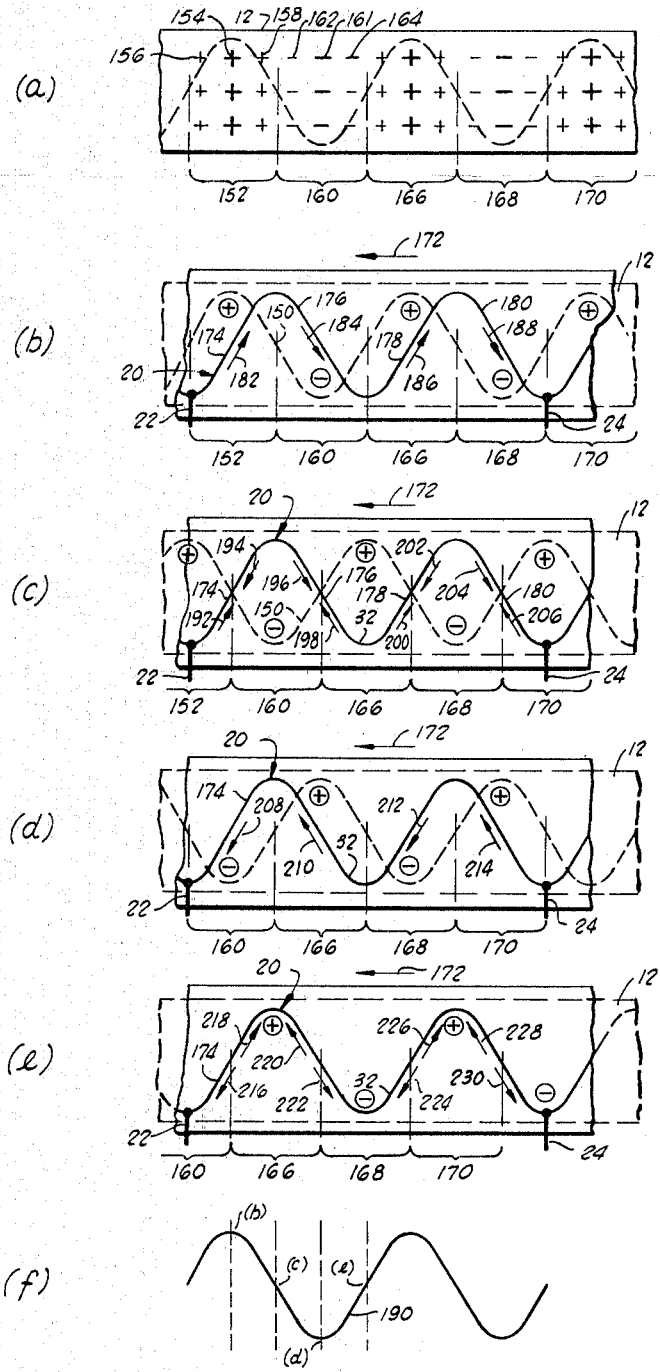

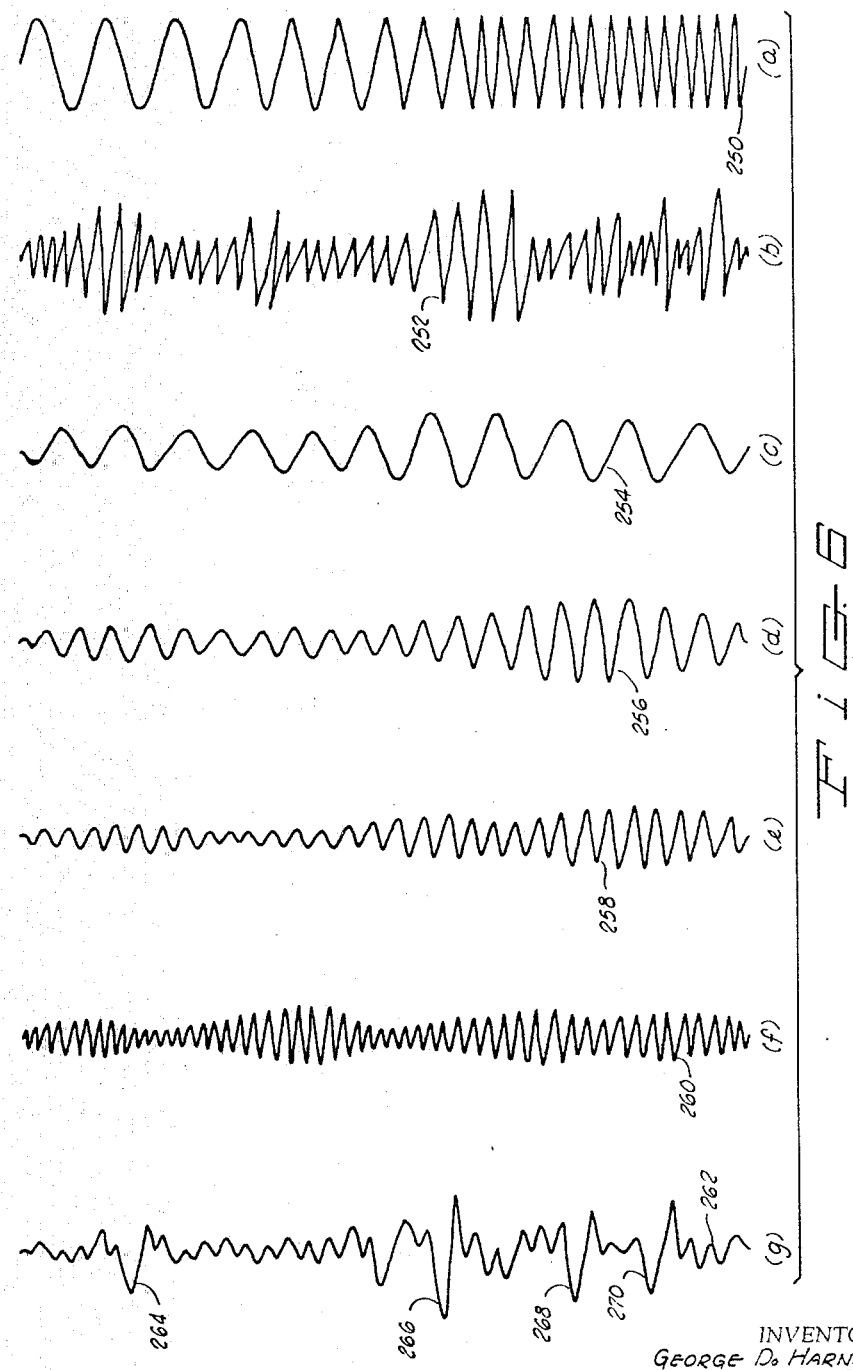

United States Patent Office 3,297,981
Patented Jan. 10, 1967

3,297,981
METHOD AND APPARATUS FOR CORRELATING AND NORMALIZING SIGNALS
George D. Harney, Douglas S. Sullivan, Milford R. Lee, and Jimmy R. Cole, Ponca City, Okla., assignors to Continental Oil Company, Ponca City, Okla., a corporation of Delaware
Filed Nov. 20, 1963, Ser. No. 325,072
6 Claims. (Cl. 340—15.5)

The present invention relates generally to the art of signal analysis and more particularly, but not by way of limitation, relates to a novel signal analyzing head and to a novel method and apparatus for correlating and normalizing seismographic signals in order to more accurately determine the presence and position of reflecting subsurface interfaces.

There are many instances in which it is desirable to analyze or determine the frequency content of an unknown signal with respect to time. This is particularly true in geophysical prospecting using the method described in its various aspects in U.S. Patents Nos. 2,688,124, 2,808,577, 2,874,795, 2,910,134 and 2,981,928 which are assigned to the assignee of the present invention. Although the present invention is particularly related to and adapted for use in connection with the method described in the reference patents it is to be understood that the method and apparatus of the present invention may also be used to advantage in connection with the other conventional types of seismographic surveying, such as the type which utilizes explosives to generate the seismic signal, and to other types of signals in general.

In the type of seismographic surveying described in Patent No. 2,688,124 and the subsequently issued patents mentioned above, a seismic sweep signal having a relatively low energy level, but having a non-repetitive, controlled frequency content and a relatively long duration, is generated by a suitable transducer. The transducer may be electrically, mechanically or hydraulically powered but is operated in close synchronization with a reference sweep signal. The sweep signal persists for several seconds over which period of time the signals vary in the range between a low frequency on the order of 10 c.p.s. and a high frequency on the order of 100 c.p.s. The typical seismic sweep signal may vary uniformly between a low frequency and a high frequency, in which case it is referred to by workers in the art as an "upsweep," or may change from a higher frequency to a lower, in which case it is referred to as a "downsweep." The seismic sweep signal generated by the transducer propagates downwardly and a portion of the seismic energy is reflected by each successive interface and travels back to the surface where it is detected by geophones and recorded by suitable means. Since the total time required for the sweep signal to travel downwardly to even the deep interfaces and return to the surface will normally be less than the time duration of the sweep signal itself, the various reflections form the subsurface interfaces will not be separated in time, but rather will overlap such that the signal detected by geophones will be very complex and will not immediately reveal the desired information regarding the travel time of the signal to the various interfaces. However, by correlating the received complex signal with the sweep signal originally generated in the earth, the precise time required for the seismic energy to travel downwardly and be reflected from each of the subsurface interfaces can be determined with considerable accuracy and the various subsurface interfaces located. The present invention is concerned with an improved method and apparatus for conducting the correlation process.

The precision of the correlation process is dependent to a large degree upon the frequency band, i.e., the width of the frequency spectrum, of the seismic sweep signal which is induced in the earth. Each time the degree of coherence between the two signals reaches a maximum, or in other words each time that the reference signal coincides substantially with a portion of the complex signal, a so-called auto-correlation pulse will be generated in the correlation signal. The auto-correlation pulse will be in the form of a maximum value on the correlation trace and will indicate the arrival time of the energy reflected from a particular subterranean interface. Accordingly, the auto-correlation pulse is referred to in the art as a "seismic event." Theoretically, if the frequency band of the seismic sweep signal is infinite and the sweep signal is of infinite length, the auto-correlation pulse or seismic event would take the form of a very sharp spike and would be an ideal indication of the precise arrival time. On the other hand, as the frequency band of the seismic sweep signal decreases in width, the auto-correlation pulse becomes less sharp so that each seismic event tends to stretch over a greater time period. Then two seismic events close in time will tend to interfere and overlap and will frequently be indistinguishable.

It has been found that a frequency band of 50 cycles, for example, provides a practical and useable seismic sweep signal. However, when using this type of seismic sweep signal, the correlation process presumes that the amplitudes of both the reference signal and the complex seismic signal throughout the frequency spectrum are substantially constant and equal. Any attenuation, cancellation or reinforcement of the amplitudes of the signals tends to interfere with the correlation process. In practice, this frequently presents a problem because the earth tends to attenuate the higher frequency portions of the seismic sweep signal more than the lower frequency portions. Further, due to the relative spacing and thickness of the various geological formations, portions of the frequency spectrum of the seismic sweep signal will frequently be either attenuated or reinforced so that the amplitudes of the seismic sweep signals returning to the surface of the earth from the various interfaces will be distorted.

Efforts have heretofore been made, and have been partially successful, to vary the amplitude of the seismic sweep signal originally induced in the earth in order to compensate for the natural tendency for the seismic signals to be attenuated. However, since the degree of cancellation or reinforcement cannot be predicted, and even the degree of attenuation will vary from one locality to the next, the amplitude distortion usually cannot be predicted in advance with sufficient certainty to warrant the deliberate distortion of the seismic signal originally generated in the earth. When the amplitude of one portion of the seismic sweep signal is attenuated, such as the upper half of the frequency spectrum from 50—90 c.p.s., the effect will be as if the total frequency spectrum were narrowed which will cause the resulting auto-correlation pulses or seismic events to extend over a greater time length so that events close in time will frequently interfere.

The present invention contemplates a novel magnetic pickup head for analyzing the frequency content of any magnetically recorded signal and a novel correlation method in which the correlation signal is "normalized" to minimize the effects of attenuation, cancellation and reinforcement of various portions of the frequency spectrum of the seismic sweep signal.

Therefore it is an important object of the present invention to provide a device for determining the energy level of a particular frequency, frequency band, or wave shape within any magnetically recorded signal.

Another object of the present invention is to provide an apparatus for economically determining the energy level of various portions of the frequency spectrum of a complex signal directly from an elongated magnetic record track such as a magnetic tape.

Yet another object of the present invention is to provide an improved method for processing seismographic data in order to more accurately determine the position and location of subsurface interfaces.

Still another object of the present invention is to provide an improved method for correlating a first signal having a predetermined wave shape with a second signal having any wave shape.

Many additional objects and advantages of the present invention will be evident to those skilled in the art from the following detailed description and drawings, wherein.

FIGS. 5(a)–5(f) are schematic diagrams which serve to illustrate the operation of the novel analyzing heads of the present invention; and, FIGS. 6(a)–6(g) are schematic illustrations of typical graphs produced by operation of the novel signal analyzing heads and circuits illustrated in FIGS. 1—4.

Figure 1:
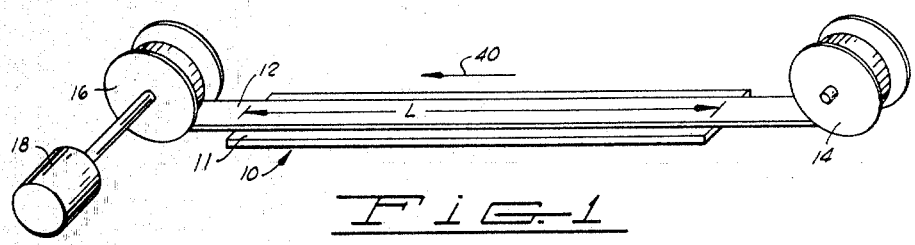
FIG. 1 is a somewhat schematic isometric drawing of a device constructed in accordance with the present invention.

Referring now to the drawings, and in particular to FIG. 1, a signal analyzing head constructed in accordance with the present invention is indicated generally by the reference numeral 10. The analyzing head 10 may have a body 11 fabricated from any suitable nonconductive material which will not interfere with lines of magnetic flux. The analyzing head 10 will usually be elongated, and may be planar, concave, convex, or any suitable shape amenable to having a magnetic tape 12 passed in close proximity to its surface over its entire length L. If the analyzing head 10 is planar, the magnetic tape 12 may be withdrawn from a storage spool 14 and moved lengthwise across the analyzing head 10 by a takeup spool 16 driven by a suitable motor 18. However, suitable means (not illustrated) should be provided to insure that the tape 12 is at all times uniformly spaced from the head 10 over the entire length L.

Figure 2:
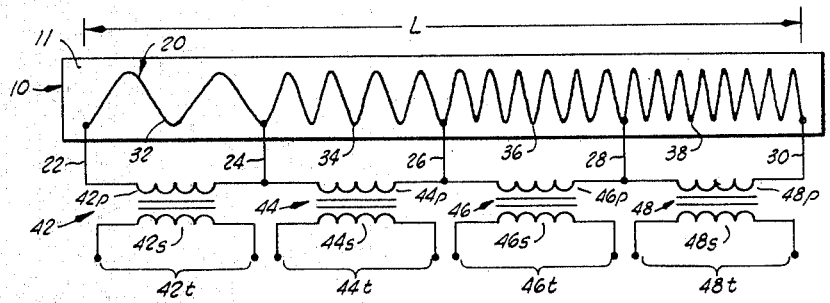
FIG. 2 is a schematic illustration of a novel signal analyzing head constructed in accordance with the present invention and the circuit means for electrically isolating the EMF's generated in the various segments of the head.

Referring now to FIG. 2, the analyzing head 10 has an elongated conductor means 20 which extends the length L of the analyzing head 10. The conductor means 20 may be formed by any suitable means, but can conveniently be formed by printed circuit techniques so as to more easily attain the desired wave form as will hereafter be described in greater detail. A plurality of electrical taps 22, 24, 26, 28 and 30 are connected at substantially uniform intervals along the conductor means 20 to divide the conductor means into four separate filter segments. For example, a filter segment 32 is formed between the taps 22 and 24, a filter segment 34 is formed between the taps 24 and 26, a filter segment 36 is formed between the taps 26 and 28, and a filter segment 38 is formed between the taps 28 and 30. As illustrated, it will be noted that the configuration of the conductor 20 within the segment 32 approximates two cycles of a sine wave. Similarly, the configuration of the conductor means within the segment 34 approximates a sine wave having four cycles. Within the segment 36 the conductor means 20 has a configuration correspondingly substantially to six cycles of a sine wave, and within the segment 38 the conductor means 20 has a configuration corresponding to eight cycles of a sine wave. Therefore, the conductor means 20 within each of the segments have fixed physical wave lengths, such that if the conductor means 20 is given the longitudinal time scale of the magnetic tape 12, the wave form of each of the segments 32, 34, 36 and 38 will represent a frequency. Thus for purposes of illustration, if the segment 32 has a frequency of 20 c.p.s. based on the time scale of the magnetic tape 12, the segment 34 would have a frequency of 40 c.p.s., the segment 36 would have a frequency of 60 c.p.s., and the segment 38 a frequency of 80 c.p.s. Then, as will hereafter be described in greater detail, as the magnetic tape 12 is moved from the storage spool 14 to the takeup spool 16 in the direction of the arrow 40 in FIG. 1, a signal will be generated in each of the segments of the conductor means 20 which will be representative of the energy level of the corresponding frequency within that portion of the signal recorded on the magnetic tape 12 which is then passing over the corresponding segment.

A circuit means for electrically isolating the E.M.F.'s generated in the individual segments of the conductor means 20 is comprised of transformers 42, 44, 46, and 48. The primary winding $42_p$ of the transformer 42 is connected across the taps 22 and 24 such that a readout signal will be produced across the terminals $42_t$ of the secondary winding $42_s$. Similarly, the primary winding $44_p$ of the transformer 44 is connected across the taps 24 and 26 such that the terminals $44_t$ of the secondary winding $44_s$ will provide a second readout signal representative of the E.M.F. generated in the segment 34 of the conductor means 20. The primary winding $46_p$ of the transformer 46 is connected across the electrical taps 26 and 28 such that the terminals $46_t$ of the secondary winding $46_s$ produce a readout signal representative of the E.M.F. generated in the segment 36 of the conductor means 20. The primary winding $48_p$ of the transformer 38 is connected across the electrical taps 28 and 30 so that the terminals $48_t$ of the secondary winding $48_s$ will produce a readout signal representative of the E.M.F. generated in the segment 38 of the conductor means 20.

Figure 3:
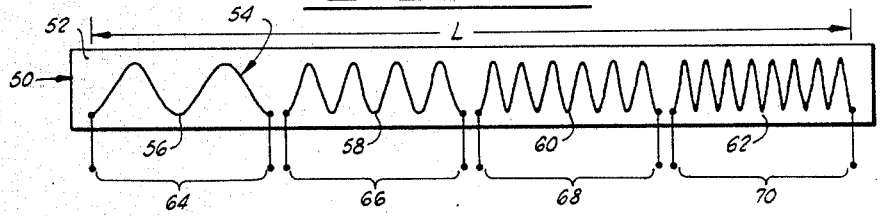
FIG. 3 is a schematic drawing of another novel signal analyzing head constructed in accordance with the present invention.

Referring now to FIG. 3, a second novel magnetic analyzing head constructed in accordance with the present invention is indicated generally by the reference numeral 50. The analyzing head 50 comprises a suitable nonconductive base 52, such as a conventional printed circuit board, and a conductor means indicated generally by the reference numeral 54 which is substantially identical in overall configuration to the conductor means 20 and extends over the length L of the analyzing head 50. However, the conductor means 54 is comprised of separate segments 56, 58, 60 and 62 which are electrically insulated one from the other substantially as illustrated. However, the segments 56, 58, 60 and 62 are oriented substantially identical with and have substantially the same shape as the segments 32, 34, 36 and 38 of the conductor means 20. Since the segments 56, 58, 60 and 62 are electrically isolated one from the other, there is no need to provide the isolation transformers 42, 44, 46 and 48 because the E.M.F.'s generated in the segments 56, 58, 60 and 62 can be taken from the pairs of terminals 64, 66, 68 and 70. The operation of the analyzing head 50 is substantially identical to that of the analyzing head 10 and the operation of both will hereafter be described in greater detail.

Figure 4:
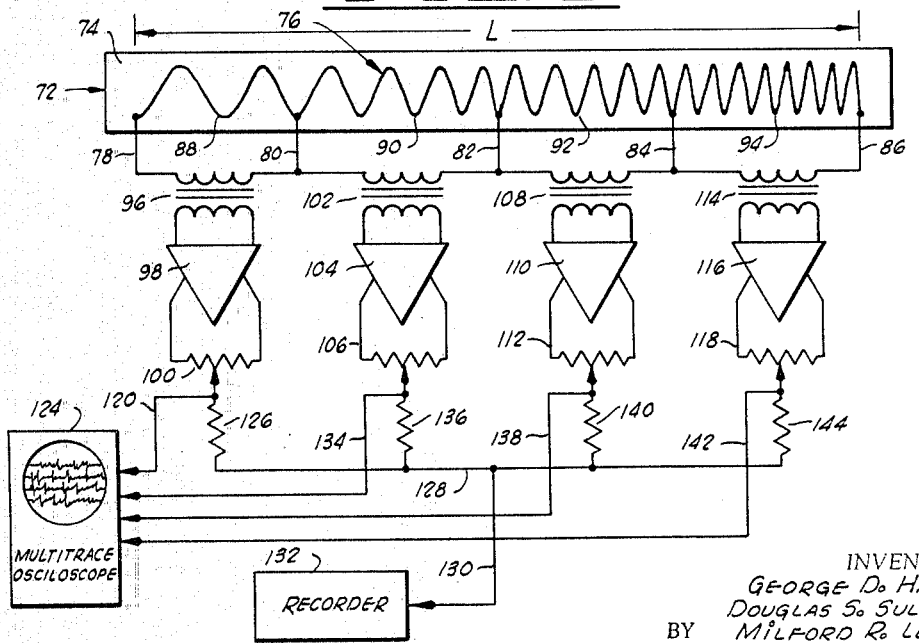
FIG. 4 is a schematic circuit diagram of still another novel signal analyzing head and circuit constructed in accordance with the present invention which can be utilized to practice the method of the present invention.

Referring now to FIG. 4, another signal analyzing head constructed in accordance with the present invention is indicated generally by the reference numeral 72 and comprises an elongated, nonconductive base portion 74 upon which an elongated conductor means 76 is mounted. The conductor means 76 is quite similar to the conductor means 20 except for its wave shape as will presently be described. A plurality of electrical taps 78, 80, 82, 84 and 86 are connected to the conductor means 76 at uniformly spaced points along its length L to divide the conductor means 76 into four segments. Thus the taps 78 and 80 form a conductor segment 88, the taps 80 and 82 form a conductor segment 90, the taps 82 and 84 form a conductor segment 92, and the taps 84 and 86 form a conductor segment 94. However, the conductor means 76 differs from the conductor means 20 in that the wave shape of each of the conductor segments 88, 90, 92 and 94 changes at a uniform rate. In other words, the wave lengths of the conductor 76 within each segment become progressively shorter when moving from left to right. Further, in the form illustrated, the wave lengths of the four segments are so related that the wave length of the conductor means 76 becomes progressively shorter over the entire length L. Then with reference to the time scale of the signal recorded on the magnetic tape 12, as previously described in connection with the analyzing head 10, the wave shape of the conductor means 76 would uniformly change from 20 c.p.s.–80 c.p.s. over the length L. Accordingly, it will be evident that the wave shape of the conductor segment 88 will change uniformly from 20 c.p.s. to 35 c.p.s., the conductor segment 90 will change from 35 c.p.s. to 50 c.p.s., the conductor segment 92 will change uniformly from 50 c.p.s. to 65 c.p.s., and the conductor segment 94 will change from 65 c.p.s. to 80 c.p.s. Of course it will be appreciated that these frequencies and frequency segments are merely specified for purposes of illustration and that the total frequency band or frequency spectrum of the conductor means 76 over the length L can be of any width and that this width can be broken down into any number of segments by electrical taps so as to provide band pass filter heads of any band width, as will hereafter be described in greater detail. It will be appreciated also that the frequency bands of the several segments need not be contiguous, but may instead represent any desired frequency bands.

An isolation transformer 96 isolates the E.M.F. generated in the conductor segment 88 and applies it to an amplifier 98, and the output of the amplifier 98 is connected across a variable resistor 100. A transformer 102 isolates the E.M.F. generated in the conductor segment 90 and applies it to an amplifier 104 the output of which is connected across the terminals of a variable resistor 106. Similarly, an isolation transformer 108 isolates the E.M.F. generated in the conductor segment 92 and applies it to an amplifier 110 and the output of the amplifier 110 is connected across a variable resistor 112, and an isolation transformer 114 is connected across the taps 84 and 86 to isolate the E.M.F. generated in the conductor segment 94 and apply it to an amplifier 116. The output of amplifier 116 is connected across a variable resistor 118. The sliding contact of the variable resistor 100 is connected by a conductor 120 to a multitrace oscilloscope 124 and by a resistor 126 to a mixing conductor 128 which is connected by a conductor 130 to a recorder 132. The sliding contact of the variable resistor 106 is connected by a conductor 134 to another channel of the multitrace oscilloscope 124, and by a resistor 136 to the mixing conductor 128 and therefore to the recorder 132. Similarly, the sliding contact of the variable resistor 112 is connected by a conductor 138 to a third channel of the oscilloscope and by a resistor 140 to the mixing conductor 128 and therefore to the recorder 132. The variable resistor 118 is connected by a sliding contact to a conductor 142 which is connected to a fourth channel of the multitrace oscilloscope, and to a resistor 144 which is connected to the mixing conductor 128. Thus it will be seen that the signals from the four resistors 126, 136, 140 and 144 are mixed by the conductor 128 and applied by the conductor 130 to the recorder 132. The recorder 132 preferably records the mixed signal as a single trace on a suitable record media (not illustrated) which is moved in synchronism with the tape 12 so that a correlation trace will be produced, as hereafter described in greater detail.

*Operation of analyzing heads of FIGS. 2, 3 and 4*

The operation of the analyzing heads of the present invention can best be understood by reference to FIGS. 5(a)–5(f). In particular, the theory of operation of the analyzing heads 10, 50, and 72 will best be understood from the following explanation of the operation of the conductor segment 32 of the conductor means 20 of the analyzing head 10. Assume for purposes of illustration that a pure sine wave signal having a wave length equal to the wave length of the conductor segment 32 is magnetically recorded upon the magnetic tape 12, as schematically represented in FIG. 5(a). The sine signal may be schematically represented by the dotted line but in actuality will be recorded as a magnetic field having alternating positive and negative polarities with the strength of the field representing the positive or negative amplitudes of the signal. Thus during the first half-cycle 152 of the signal 150, the magnetic field on the tape 12 would be of positive polarity having a maximum strength at the center of the half-cycle as represented by the large plus symbols 154 and of weaker strength on either side as represented by the smaller plus symbols 156 and 158. During the second half-cycle 160 the polarity of the magnetic field would conventionally be negative and would have a maximum strength represented by the large minus symbols 161 at the center and the smaller minus symbols 162 and 164 represent the intermediate amplitudes. The first and second half-cycles 152 and 160 would of course constitute a single wave length. The next half-cycle 166 would again be of positive polarity, the fourth half-cycle 168 would reverse back to negative polarity, the fifth half-cycle 170 would of course again be of positive polarity, and each succeeding half-cycle would reverse in polarity in the same manner. Of course it will be understood, as hereafter described in greater detail, that any signal regardless of its wave shape could be represented schematically in substantially the same fashion. Further, it will be appreciated by those skilled in the art that most complex signals can be at least approximately expressed as the algebraic sum of a number of constant frequency, sinusoidal waves so that the wave shape illustrated in FIG. 5(a) may be but a component of a complex signal as will hereafter be described in greater detail.

In FIG. 5(b), the length of the magnetic tape 12 illustrated in FIG. 5(a) is shown in dotted outline and superimposed over the conductor segment 32 of the conductor means 20. Assume for the moment that the tape 12 is moved from right to left as represented by the arrow 172 and that the magnetic field of the tape is moving relative to the conductor means 20 so as to generate an E.M.F. therein. As illustrated, it will be noted that the signal 150 is 90 degrees out-of-phase with the wave form of the conductor segment 32. Thus the half-cycle 152 overlies the first rising portion 174 of the conductor segment 32, the second negative half-cycle 160 overlies the falling portion 176 of the conductor segment 32, the third half-cycle 166 overlies the second rising portion 178 and the fourth negative half-cycle 168 overlies the second falling portion 180 of the conductor segment 32. Therefore as the magnetic tape 12 is moved in the direction of the arrow 172, the positive magnetic field of the first half-cycle 152 will generate an E.M.F. in the first rising portion 174 in the direction of the arrow 182, for example. At the same time, the negative magnetic field of the second half-cycle 160 will generate an E.M.F. in the falling portion 176 of the conductor segment 32 in the direction of the arrow 184, the positive magnetic field of the third half-cycle 166 will generate an E.M.F. in the direction of the arrow 186 in the portion 178 and the negative magnetic field of the fourth half cycle 168 will generate an E.M.F. in the direction of the arrow 188 in the portion 180. Thus it will be noted that the E.M.F.'s generated in each of the portions 174, 176, 178 and 180 are in the same direction and are additive so that a maximum E.M.F. will be generated across the taps 22 and 24. As previously described, the isolation transformer 42 will effectively pass only this voltage signal on to the output terminals 42$_t$. Assuming that the terminals 42$_t$ are connected to a suitable recording machine or visual display device, an output curve 190, as illustrated in FIG. 5(f), can be expected as will presently be described. In particular, the E.M.F. generated when the tape 12 is in the position illustrated in FIG. 5(b) is represented as the maximum positive point b.

When the magnetic tape 12 has been shifted one-fourth wave length to the left, as illustrated in FIG. 5(b), it will be in the position illustrated in FIG. 5(c). Then the wave shape 150 will be substantially 180 degrees out-of-phase with the conductor segment such that a portion of the positive field of the first half-cycle 152 will generate a small E.M.F. in the direction of the arrow 192 in the rising portion 174 of the conductor segment 32. The leading portion of the negative field of the second half-cycle 160 will also generate a small E.M.F. represented by the arrow 194 in the same portion 174 of the conductor segment which will be substantially equal and opposite to the E.M.F. represented by the arrow 192 so that the two E.M.F.'s will cancel. Similarly, the trailing edge of the negative field of the second half-cycle 160 and the leading edge of the positive field of the third half-cycle 166 will generate cancelling E.M.F.'s in the falling portion 176 represented by the arrows 196 and 198. Also, the trailing and leading edges of the positive and negative magnetic fields of the half-cycles 166 and 168 will similarly generate counteracting and cancelling E.M.F.'s represented by the arrows 200 and 202 in the second rising portion 178 of the conductor segment 32, and the trailing and leading edges of the negative and positive half-cycles 168 and 170 will generate cancelling E.M.F.'s represented by the arrows 204 and 206 in the falling portion 180. Thus it will be noted that no net E.M.F. will result across the electrical taps 22 and 24 and the output curve 190 will have a zero value as represented at point c.

When the tape 12 has moved another one-fourth wave length in the direction of the arrow 172, it will overlie the conductor segment 32 substantially as illustrated in FIG. 5(d). Then the negative half-cycle 160 will generate an E.M.F. in the conductor segment 32 in the direction of arrow 208, the positive half-cycle 166 will generate an E.M.F. in the direction of arrow 210, the negative half-cycle 168 will generate a signal in the direction of arrow 212, and the positive half-cycle 170 will generate an E.M.F. in the direction of arrow 214. Since the four E.M.F.'s generated in the conductor segment 32 are in the same direction, a maximum negative voltage will result across the electrical taps 22 and 24, as indicated by the point d on the curve 190 in FIG. 5(f). Then when the magnetic tape 12 has moved another one-fourth wave length, it will be in the position illustrated in FIG. 5(e). The positive and negative magnetic fields of the several half-cycles will then generate counteracting and cancelling E.M.F.'s represented by the arrows 216, 218, 220, 222, 224, 226, 228 and 230 so that the voltage across the electrical taps 22 and 24 will again be zero and the output signal 190 will again be zero at point e. Of course, so long as the same constant frequency signal continues to be moved past the conductor segment 32, the same wave shape 190 will continue to appear across the electrical taps 22 and 24.

Thus it will be noted that the output from the filter head conductor segment 32 has a wave length corresponding to the wave length of the conductor segment 32 which of course also corresponds to the wave length of the signal 150 on the magnetic tape 12. It will be evident that each of the other conductor segments 34, 36 or 38 will function in precisely the same manner when the wave length of the signal magnetically recorded on the magnetic tape 12 corresponds to the wave length of the respective conductor segments. More importantly, it will be appreciated by those skilled in the art that virtually any complex signal can be broken down into a number of constant frequency signals, as previously mentioned, which in special cases are sometimes referred to as "harmonics." Thus it will be evident that regardless of the frequency or the complexity of the signal recorded upon the magnetic tape 12, each of the respective conductor segments will generate a signal having a wave length corresponding to the wave length of the respective conductor segments, and that the amplitude of the signal generated by each segment will be proportional to and therefore representative of the amplitude of that particular wave length component of the complex signal. Accordingly, it will be evident that each of the conductor segments 32, 34, 36 and 38 comprises a magnetic frequency filter which will effectively filter its corresponding wave length from any complex signal and will reproduce the signal in substantially the same shape and frequency.

As previously described, the conductor means 54 is substantially identical to the conductor means 20, except that the several conductor segments 56, 58, 60 and 62 are electrically insulated one from the other so as to permit elimination of the isolation transformers 42, 44, 46 and 48. Thus the operation of the analyzing head 50 and each of the conductor segments 56, 68, 60 and 62 will be identical to the operation of the conductor segment 32 as described above. It will also be evident that the conductor segments can assume virtually any wave shape other than pure sinusoidal. For example, the sinusoidal wave shape may be roughly approximated by a sawtooth configuration comprised of straight line conductor portions extending between the peaks. Square wave shapes may be used to approximate any particular frequency without regard to the wave shape and of course will precisely filter out square wave signals. Further, as in the case of the analyzing head 72, the conductor segments may assume a progressively changing wave length so as to represent a frequency band. The operation of the various segments of the analyzing head 72 is substantially the same as that of the segment 32. Any single wave length in the complex signal on the tape 12 which matches with a corresponding wave length of the conductor segment will generate a net E.M.F. in the conductor segment. Also, at least some net E.M.F. will be generated in the adjacent wave lengths so that a voltage over the entire segment will be representative of the level of that particular frequency. Of course if there are a number of frequencies in the complex signal that fall within the frequency band of the conductor segment, the amplitude of the net readout signal from the segment will be increased accordingly to indicate the total energy of the frequencies within the frequency band.

*Operation of device of FIG. 4 and method of correlating two signals*

The operation of the device of FIG. 4 can best be understood by describing its use for practicing the method of normalizing and correlating a seismographic or other signal in accordance with the present invention. Assume that a seismic sweep signal having a wave shape of the conductor means 76 and as approximated by the wave shape 250 illustrated in FIG. 6(a) is induced in the earth at one point. The seismic sweep signal will propagate downwardly as a wave front and a portion of the seismic energy will be reflected by the subsurface interfaces. The reflected energy will return to the surface where it can be magnetically recorded on a record tape such as the magnetic tape 12 as a complex signal which may be graphically represented as the trace 252 of FIG. 6(b) which, due to space limitations, represents only a portion of the total complex signal which will of course be longer than the sweep signal by the travel time in the earth.

Then as the magnetic tape 12, with the complex seismographic signal 252 magnetically recorded thereon, is moved longitudinally over the signal analyzing head 72, and in particular over the conductor means 76, the frequencies within the frequency band from 20–35 c.p.s. will be filtered out by the conductor segment 88 to produce a signal having a frequency within the 20–35 c.p.s. band, depending upon the predominant frequency within the complex signal 252. The signal will be isolated from the signal generated in the other conductor segments of the conductor means 76 by the isolation transformer 96, and fed to the amplifier 98. The output from the amplifier 98 will be passed through the variable resistor 100 and will be displayed on the multitrace oscilloscope 124 where it will typically appear as the trace 254 of FIG. 6(c). The amplitudes of the trace 254 will be representative of the energy level of the complex signal 252 that is within the frequency band from 20–35 c.p.s. A similar filter signal will be generated in the conductor segment 90 and will be passed through the transformer 102, the amplifier 104, the variable resistor 106 and the conductor 134 to a second channel of the multitrace oscilloscope 124 where it will appear as the trace of 256 of FIG. 6(d). The trace 256 will have a frequency within the 35–50 c.p.s. frequency band and will have an amplitude representative of the total energy level of the 35–50 c.p.s. frequencies of the complex signal 252. Similarly, the signal generated in the conductor segment 92 will be transmitted through the transformer 108, the amplifier 110, the variable resistor 112 and the conductor 138 to a third channel of the multitrace oscilloscope 124 and displayed as the trace 258 as shown in FIG. 6(e). The trace 258 will have a frequency within the 50–65 c.p.s. frequency band and its amplitude will represent the energy level of the frequencies within the complex signal 252 lying in the 50–65 c.p.s. frequency band. In the same manner, the signal generated in the conductor segment 94 will be transmitted through the isolation transformer 114, the amplifier 116, the variable resistor 118 and the conductor 142 to the fourth channel of the multitrace oscilloscope 124 where it will be displayed as the trace 260 having a frequency within the band from 65–80 c.p.s. and having an amplitude representative of the energy level of that band within the complex signal.

If the variable resistors 100, 106, 112, and 118 are set at the same level and the seismic sweep signal 250 is not distorted by cancellation, reinforcement or attenuation before its return and recordation as the complex trace 252, the four traces 254, 256, 258 and 260 from the four respective conductors segments would, theoretically at least, have the same peak amplitudes. In such a case, the four signals could be mixed together and would produce a generally ideal correlation signal, such as illustrated in FIG. 6(g), which would have relatively sharp auto-correlation points indicative of seismic events. In actuality however, due to the relative positions of the subsurface interfaces and the natural tendency of the earth to attenuate the higher frequencies, the amplitude of various portions of the frequency spectrum of the seismic sweep signal is invariably distorted to various degrees before its return and recordation as a complex seismographic trace. Reinforcement or cancellation of a portion of the frequency spectrum, i.e., of a particular frequency band, of the seismic sweep signal will have much the same effect upon the correlation process as shortening the frequency spectrum. Of course, as is illustrated by any one of the traces 254, 256, 258 or 260, which are correlation traces of a relatively narrow frequency band, as the frequency band of the seismic signal is narrowed the seismic events spread over greater time periods and become less distinguishable.

Therefore, in accordance with the method of the present invention, the amplitudes of the various frequency bands within the complex signal 252 can be determined from the traces 254, 256, 258 and 260 merely by comparing the peak amplitudes of the various traces as displayed on the oscilloscope 124 in a particular time zone of interest. Then the various signals can be adjusted by manipulation of the appropriate variable resistors 100, 106, 112 or 118 until the peak amplitudes of the four traces are substantially equal in the time zone of interest. When the four adjusted signals are subsequently recombined by the mixing circuit comprised of the conductor 128, the recorder 132 will produce a normalized correlation signal 262 such as illustrated in FIG. 6(g). It will be noted that the correlation signal 262 has a series of very distinct seismic events 264, 266, 268 and 270 having a generally common shape, which is referred to by workers in the art as an auto-correlation pulse.

From the above detailed description of several preferred embodiments of the present invention and the method of the present invention, it will be evident that a novel signal analyzing head has been described which provides a means for analyzing the frequency content of substantially any signal. The analysis can be made directly from a magnetic record track by means of the novel magnetic analyzing heads so that the analysis can be performed very quickly, easily and economically. Further, the signal analyzing heads in accordance with the present invention can be constructed in such a manner as to be capable of determining the energy level of a wide variety of wave shapes within substantially any given complex signal. A novel method has also been described for overcoming to some degree the adverse effects caused by attenuation of a seismic sweep signal by the earth by magnetically filtering various frequency bands from a complex signal, adjusting the amplitudes of the filtered frequency bands to eliminate amplitude distortion of the bands, and then recombining the bands to provide a normalized correlation signal for determining the location of seismic events with greater accuracy.

Although several preferred embodiments of the present invention have been described in detail, it is to be understood that various changes, substitutions and alterations can be made therein without departing from the spirit and scope of the invention as defined by the appended claims.

What is claimed is:
1. A device for determining the energy level of a plurality of different wave shapes within a signal magnetically recorded on an elongated record member having a longitudinally extending time scale, the device comprising:
    an elongated strip insulating material; and
    electrical conductor means mounted on said strip having the shape of a waveform desired to be detected and having a longitudinally extending time scale, said conductor means being divided into at least two sections representing different frequencies;
    signal indicating means having a channel for each of said sections; and
    a separate circuit connecting each of said sections to its respective channel of the indicating means;
    whereby when the elongated record member is moved in close proximity to the electrical conductor means with the longitudinally extending time scale of the record member disposed generaly parallel to the longitudinally extending time scales of each of the sections, the electrical signal generated in each section of the conductor means will be indicative of the energy level of the corresponding wave shape within the adjacent portion of the recorded signal with respect to time.
2. A device for determining the energy level of a plurality of separate wave shapes within a signal magnetically recorded on an elongated record member having a longitudinally extending time scale as defined in claim 1 wherein:
    the wave shape within each section progressively changes in frequency and comprises a frequency band.
3. A device for determining the energy level of a plu- rality of separate wave shapes within a signal magnetically recorded on an elongated record member having a longitudinally extending time scale as defined in claim 2 wherein:

the sections are arranged in end-to-end relationship with the time scales aligned and the frequencies of the wave shapes within the successive sections provide a continuous frequency change and a frequency spectrum.

4. A device for determining the energy level of a plurality of separate wave shapes within a signal magnetically recorded on an elongated record member having a longitudinally extending time scale as defined in claim 1 wherein:

the wave shape within each section has a constant frequency, and the frequency of each of the sections is different.

5. A device for determining the energy level of a plurality of separate wave shapes within a signal magnetically recorded on an elongated record member having a longitudinally extending time scale as defined in claim 1 wherein:

each of the sections of the electrical conductor means is electrically insulated from the others.

6. The device of claim 1 wherein each of said separate circuits includes:

first electrical circuit means operatively connected to the respective section for adjusting the amplitude of the electrical signal generated in the respective section; and characterized further to include:

second electrical circuit means operatively connected to all of the first electrical circuit means for mixing the adjusted electrical signals to produce a single electrical signal, whereby the degree of coherence between the signal magnetically recorded on the record member and the total wave shape of the signal analyzing head may be more accurately determined.

References Cited by the Examiner

UNITED STATES PATENTS

| | | | |
|---|---|---|---|
| 3,023,966 | 3/1962 | Cox et al. | 340—15.5 |
| 3,063,034 | 11/1962 | Lee | 340—15.5 |
| 3,174,142 | 3/1965 | Mallinckrodt | 340—15.5 |
| 3,199,106 | 8/1965 | Karr | 340—15.5 |

FOREIGN PATENTS

| | | |
|---|---|---|
| 1,329,739 | 5/1963 | France. |
| 1,341,496 | 9/1963 | France. |

OTHER REFERENCES

Sarbacher, Dictionary of Electronics and Nuclear Engineering, Prentice-Hall Inc., New Jersey, 1959, p. 842.

BENJAMIN A. BORCHELT, *Primary Examiner.*

R. M. SKOLNIK, *Assistant Examiner.*